United States Patent [19]
Keating et al.

[11] 3,843,587
[45] Oct. 22, 1974

[54] POLYAMIDE-IMIDE RESINS PREPARED FROM THE REACTION OF AROMATIC DIISOCYANATES WITH MIXTURES OF POLYCARBOXYLIC ACIDS AND ANHYDRIDES

[75] Inventors: John T. Keating; John L. Simonian, both of Schenectady, N.Y.

[73] Assignee: Schenectady Chemicals, Inc., Schenectady, N.Y.

[22] Filed: May 16, 1969

[21] Appl. No.: 825,267

[52] U.S. Cl............ 260/30.2, 117/75, 117/128.4, 117/232, 260/30.8 R, 260/30.8 DS, 260/32.4, 260/32.6 N, 260/33.4 P, 260/33.6 R, 260/47 CB, 260/63 N, 260/77.5 R
[51] Int. Cl............................................. C08g 20/32
[58] Field of Search....... 260/47 CZ, 77.5, 77.5 CH, 260/78 TF, 63 N; 117/232, 75, 128.4

[56] References Cited
UNITED STATES PATENTS

| | | | |
|---|---|---|---|
| 3,300,420 | 1/1967 | Frey | 260/2.5 |
| 3,314,923 | 4/1967 | Muller et al. | 260/78 |

FOREIGN PATENTS OR APPLICATIONS

| | | | |
|---|---|---|---|
| 1,168,978 | 10/1969 | Great Britain | 260/47 |

*Primary Examiner*—Lester L. Lee
*Attorney, Agent, or Firm*—Cushman, Darby & Cushman

[57] ABSTRACT

A polyamide-imide is made from (1) an aromatic diisocyanate, (2) an aromatic dicarboxylic acid (3) an aromatic dianhydride and (4) trimelletic anhydride. The products are useful for coating electrical conductors.

8 Claims, 2 Drawing Figures

POLYAMIDE-IMIDE RESINS PREPARED FROM THE REACTION OF AROMATIC DIISOCYANATES WITH MIXTURES OF POLYCARBOXYLIC ACIDS AND ANHYDRIDES

The present invention relates to the preparation of polyamide-imides.

It is an object of the present invention to prepare novel amide-imide polymers and wire enamels therefrom.

Another object is to prepare an electrical conductor coated with such a polymer having improved properties.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting (1) an aromatic diisocyanate with, (2) an aromatic dicarboxylic acid in which the carboxyl groups are not in the ortho positions, (3) pyromelletic dianhydride and/or benzophenone dianhydride and (4) trimellitic anhydride to form a thermally stable polyamide-imide.

There is employed 0.95 to 1.01 moles of a diisocyanate for each mole total of (2), (3) and (4).

As the aromatic isocyanate there is preferably employed 4,4'-diisocyanato-diphenylmethane or a mixture of 0.75 to 1.01 moles of 4,4'-diisocyanato-diphenylmethane with 0.25 to 0.0 moles of toluylene diisocyanate (either the 2,4-isomer, the 2,6-isomer or mixtures of such isomers.)

Less preferably other aromatic diisocyanates can be used such as toluylene diisocyanate (either the 2,4-isomer, the 2,6-isomer or mixtures of these isomers), 4,4'-bi-o-tolylene diisocyanate, 4,4'-methylene-di-o-tolylisocyanate, p-phenylene diisocyanate, 4-methoxy-1,3-phenylene diisocyanate, 4-chloro-1,3-phenylene diisocyanate, 4-esopropyl -1,3-phenylene diisocyanate, 2,4'-diisocyanato diphenyl ether, 4,4'-diisocyanato diphenyl ether, 3,3'-dimethyl-4,4'-diisocyanato diphenyl methane, mesitylene diisocyanate, durylene diisocyanate, 3,3'-bitolylene-4,4'-diisocyanate, 1,5-naphthalene diisocyanate, 4,4'-diisocyanato diphenyl sulfone.

As the aromatic dicarboxylic acid there is preferably employed terephthalic acid. There can also be employed isophthalic acid or 4,4'-benzophenone dicarboxylic acid. Mixtures of such dicarboxylic acids can also be employed. There are employed 0.05 to 0.40 mole of the dicarboxylic acid.

There is employed 0.01 to 0.30 moles of the pyromellitic dianhydride and/or the benzophenone dianhydride of which usually the pyromellitic anhydride is employed in an amount of up to 0.17 mole and the benzophenone dianhydride is usually employed in an amount up to 0.30 mole. Benzophenone dianhydride has the formula

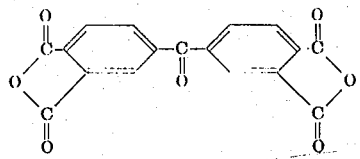

There can also be used other aromatic dianhydrides such as naphthalene 2, 3, 6, 7 dianhydride, naphthalene 1, 2, 5, 6 dianhydride, diphenyl 2, 3, 2', 3'-dianhydride, the dianhydride of 2,2-bis (3', 4'-dicarboxyphenyl) propane, the dianhydride of bis (3,4-dicarboxyphenyl) sulfone and perylene 3,4,9,10-dianhydride in place of the benzophenone dianhydride and/or the pyromellitic dianhydride.

The trimellitic anhydride is used in an amount of 0.5 to 0.80 moles.

The polyamide-imide forming reaction is conveniently carried out in the presence of the same solvents used to form the wire enamel. Thus there can be used N-methyl pyrrolidone, dimethyl acetamide, dimethyl formamide, dimethyl sulfoxide, N-methyl caprolactam, cresylic acid, p-cresol, m-p-cresol mixture, dimethyl sulfone, phenol, diethyl formamide, diethyl acetamide. Mixtures of solvents can be used, e.g., blends of N-methyl pyrrolidone with dimethyl acetamide and/or dimethyl formamide, a mixture of N-methyl pyrrolidone, dimethyl acetamide and toluene (6:3:4); a mixture of N-methyl pyrrolidone and xylene; a mixture of phenol, cresylic acid and Solvesso 100 (an aromatic naphtha derived from petroleum).

Both aliphatic and aromatic hydrocarbons can be used as diluents, e.g., aromatic naphthas such as Solvesso 100, toluene, xylene, and aliphatic hydrocarbons such as octane, decane, dodecane and tetradecane.

The polyamide-imides of the present invention are employed as wire enamels while in solution in a solvent system such as those specified above. They are applied to an electrical conductor, e.g. copper, silver, aluminum or stainless steel wire in conventional fashion, e.g. by the "free dip" method or the "die application" procedure both of which are described in Meyer patent 3,201,276. Wire speeds of 15 to 45 feet per minute or even higher can be used with wire tower temperatures of 250° to 800° F., usually with a final temperature of above 500° F. The build-up of the polyamide-imide enamel on the wire can be 0.005 to 0.010 inch, preferably 0.002 to 0.004 inch when using No. 18 wire. The wire is passed through the enamel one or more times until the desired build-up is obtained. (The build-up is the total increase in diameter over the bare wire diameter.)

The four component polyamide-imide polymers of the present invention when applied to wire impart higher cut through, better running properties, better heat shock and better heat life than regular polyamide-imides now on the market or of polyesters.

The polyamide-imide resins of the present invention are also useful as overcoats over a base coat of a cured polyester resin applied to an electrical conductor. As the base coat there can be used conventional polyesters made from (1) polycarboxylic acids (2) glycols and (3) polyols such as the reaction products of (1) terephthalic acid or isophthalic acid, (2) ethylene glycol, butanedoil-1,4 or neopentyl glycol, (3) glycerine, pentaerythritol or tris (2-hydroxyethyl) isocyanurate. As the base coat for example, there can be used any of the polyesters disclosed in U.S. Pat. Nos. to Sheffer 2,889,304, Sheffer 2,982,754, Precopio 2,936,296, Jordan 3,296,024, Meyer 3,342,780 and Meyer 3,249,578. The entire disclosure of these 6 patents is hereby incorporated by reference. Particularly, valuable products are obtained when the base coat polyester is made from terephthalic acid, ethylene glycol and tris (2-hydroxyethyl) isocyanurate; the formulations in Meyer U.S. Pat. No. 3,249,578 are particularly preferred.

Unless otherwise indicated all parts and percentages are by weight.

The invention will be understood best in connection with the drawings wherein.

Figure 1:
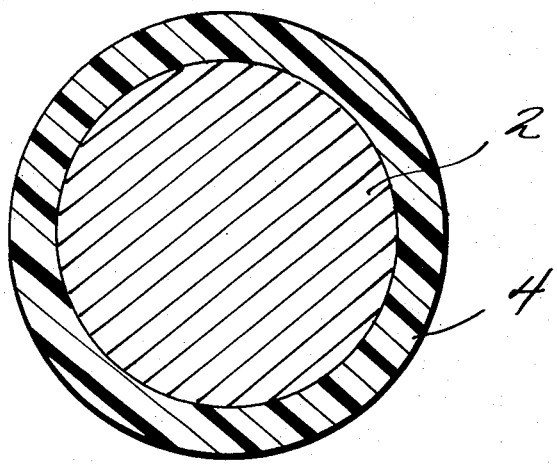
FIG. 1 is a sectional view of a wire coated according to the invention.

Referring more specifically to FIG. 1, there is provided a copper wire 2 having a coating 4 of the polyamideimide of the present invention.

Figure 2:
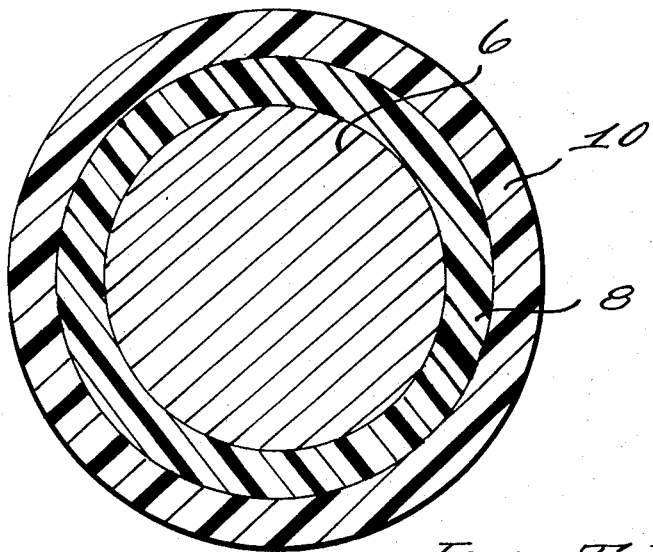
FIG. 2 is a sectional view of another form of the invention.

As shown in FIG. 2, a copper wire 6 is provided with a base coat 8 of cured terephthalic acid-ethylene glycoltris (2-hydroxyethyl) isocyanurate polyester and have an overcoat 10 of the polyamide-imide resin of the present invention.

EXAMPLE 1

251 grams of 4,4'-diisocyanato-diphenylmethane were dissolved in 1,428 grams of anhydrous N-methyl pyrrolidone. To this was added 49.8 grams of terephthalic acid, 115.2 grams of trimellitic anhydride and 21.8 grams of pyromelletic dianhydride. The temperature of the reaction was raised to 320°F. in 2.5 hours and the temperature maintained between 320°-340°F. for an additional 7.5 hours. At this time, 310 grams of Solvesso 100 and 330 grams of N-methyl pyrrolidone were added. The resulting solution had a viscosity of 3,100 centipoises 77°F. A copper wire of 0.400 inches diameter was coated with the amide imide solution by six passages of the wire through a vertical enamelling machine. The coated wire possessed a good resistance to heat shock and a cut-through-temperature above 380°C.

EXAMPLE 2

The reaction to form the polyamide imide of Example 1 was carried out in 1,337 grams of N-methyl pyrrolidone in a manner analogous to Example 1. The polymer solution was diluted with 205 grams of dimethylacetamide and 514.5 grams of Solvesso 100. When coated on copper wire as in Example 1, the enamelled wire possessed good heat resistance.

EXAMPLE 3

251 grams of 4,4'-diisocyanato-diphenylmethane were dissolved in 1468 grams of N-methyl pyrrolidone. A mixture of 16.1 grams of benzophenone dianhydride, 21.8 grams pyromellitic dianhydride, 41.5 grams terephthalic acid and 115.2 grams of trimellitic anhydride were introduced. The temperature was raised from 68°F. to 320°F. in 3 hours and maintained at 320°-330°F. for 11 more hours. The polymer solution was further diluted with 325 grams of N-methyl pyrrolidone and 317 grams of Solvesso 100. when coated on copper wire with an enamelling machine the enamelled wire possessed good resistance to heat shock.

EXAMPLE 4

A polyamide imide analogous to Example 1 was prepared where the dianhydride was benzophenone dianhydride, 32.2 grams, in place of the pyromellitic dianhydride. The polymer was cooked in 1,477 grams of N-methyl pyrrolidone to a viscosity of 38,800 centipoises 77°F. and further diluted with 212 grams of dimethylacetamide, 318 grams of Solvesso 100 and 113 grams of N-methyl pyrrolidone. When coated on copper wire as in Example 1 the enamelled wire showed good resistance to heat and mechanical stress.

EXAMPLE 5

251 grams of 4,4'-diisocyanato-diphenylmethane were dissolved in 1,192 grams of anhydrous N-methyl pyrrolidone and 211 grams of anhydrous Solvesso 100. 153.6 grams of trimellitic anhydride, 16.4 grams benzophenone dianhydride, 21.8 grams pyromellitic dianhydride and 8.2 grams of terephthalic acid were added. The temperature was increased to 350°F. and maintained until a viscosity of 6,300 centipoises 77°F. was reached. The polymer solution was then diluted with 213 grams of N-methyl pyrrolidone and 37 grams of Solvesso 100. When the resulting polymer solution was coated on wire as in Example 1, the resulting copper wire showed good resistance to heat shock and mechanical stress.

EXAMPLE 6

A reaction analogous to Example 1 was carried out by heating until the product had a viscosity of 38,800 centipoises at 77°F. and was then subsequently thinned with dimethylacetamide, N-methyl pyrrolidone and Solvesso 100 to a viscosity of 3,700 centipoises 77°F. and a final solvent ratio of 75 percent N-methyl pyrrolidone, 10% dimethylacetamide and 15% Solvesso 100. The amide-imide solution was coated on wire as in Example 1. The enamelled copper wire exhibited good heat shock and cut-through-temperature.

EXAMPLE 7

The polyamide-imide of Examples 1, 2, 3, 4 and 6 were used as topcoats over a polyester wire enamel. The copper wire was coated with a polyester by 3 or 4 passages of 18 gauge copper wire through a vertical enamelling machine, resulting in a polymer build of 2.1–2.3 mils. The enamelled wire was further coated with the specified amide-imide by 2 or 3 more passes through the wire tower resulting in a final coating of 3.0 mils on the copper wire. The resulting enamelled wires possessed good heat shock.

The polyester wire enamel employed was made in accordance with Meyer U.S. Pat. No. 3,249,578 by reacting 1,666 pounds of ethylene glycol with 6,250 pounds of tris(2-hydroxyethyl)isocyanurate and 7,125 pounds of terephthalic acid at a temperature increasing from 390°F. to 465°F. until a 30 percent check-out in cresylic acid had viscosity of Y1/2-Z. There was then added a total of 21,200 pounds of cresylic acid and 12,500 pounds of aromatic hydrocarbon boiling in the same range as Solvesso 100. There was then added 3,343 pounds of a 40 percent solids cresolformaldehyde resin, as made in Example 8 of the Meyer U.S. Pat. No. 3,249,578, 708 pounds of tetra isopropyl titanate and the mixture was adjusted to 29.5 to 30 percent solids by adding cresylic acid and the aromatic hydrocarbon solvent in the ratio of 65 to 35 to form formulation A.

The properties of coated wires when the polyamide imide resins of Examples 1–6 were applied in the form of the wire enamels shown therein directly to No. 18 AWG copper wire to form a continuous coating thereon are set forth in Table 1. The properties when the polyamide-imide resins are applied as an overcoat to polyester base coated copper wire (the polyester base coat being formed from polyester formulation A) are set forth in Table 2. In the "build" the first figure is the thickness of the undercoat and the second figure is the thickness of the amide-imide layer.

dicarboxyphenyl) propane, the dianhydride of bis (3,4-dicarboxyphenyl) sulfone and perylene 3, 4, 9, ,10-dianhydride in an amount of 0.01 to 0.30 moles, and (4) trimellitic anhydride in an amount of 0.5 to 0.80 moles, the total of (2), (3) and (4) adding up to 1 mole.

2. A polyamide-imide resin according to claim 1 where the diisocyanate is selected from the group con-

TABLE 1

WIRE ENAMEL TEST RESULTS

| Example | 1 | 2 | 3 | 4 | 5 | 6 |
|---|---|---|---|---|---|---|
| Build (mils) | 2.8–2.9 | 2.5 | 2.6 | 2.8–2.9 | 2.6 | 2.7 |
| Speed, ft/min | 30* | 30* | 30* | 40 Δ | 30* | 40 |
| Appearance | Good | Good | Good | VSW | Good | VSW |
| Mandrel, X diameter before snap | 1X | 1X | 1X | 1X | 1X | 1X |
| Snap | OK | OK | OK | OK | OK | OK |
| Mandrel, X diameter after snap | 2X | 2X | 3X | 2X | 2X | 2X |
| Abrasion Unidirectional scrape, grams | 1.58=1.68 | 1.25=1.45 | 1.48=1.76 | 1.28=1.65 | 1.62=1.70 | 1.82=1.91 |
| Cut Through Temperature °C. | 390–380 | 388–360 | 370–360 | 379–380 | 320–332 | 390–390 |
| Heat shock at 260°C. 20% Prestretch | | | | | | |
| 1X diameter | 10 | 90 | 80 | 60 | 30 | 70 |
| 2X diameter | 100 | 100 | 90 | 90 | 80 | 80 |
| 3X diameter | | | 100 | 100 | 100 | 100 |
| 4X diameter | | | | | | |
| Burnout | 7.3** | 6.9** | 6.1** | 6.1** | | 9.4** |

* A vertical 12 ft. oven
Δ A vertical 15 ft. oven
☐ Reliance burnout; a twisted sample of the enamelled wire subjected to 40 amperes until it shorts out, and time to failure measured in seconds. (potential between twists is 110 v)
** A twisted sample of the enamelled wire subjected to 33 amperes for 4 min. and the dielectric breakdown measured in kilovolts.

TABLE 2

WIRE ENAMEL TEST RESULTS (Topcoat over Polyester)

| Example | 1 | 2 | 3 | 4 | 6 |
|---|---|---|---|---|---|
| Build (mils) | 2.1+0.9 | 2.3+0.7 | 2.3+0.8 | 2.3+0.7 | 2.1+0.8 |
| Speed, ft/min | 33* | 33* | | 33*Δ | |
| Appearance | Good | VSW | Good | Good | Good |
| Mandrel, X diameter before snap | 1X | 1X | 1X | 1X | 1X |
| Snap | OK | OK | OK | OK | OK |
| Mandrel, X diameter after snap | 2X | 2X | 2X | 1X | 1X |
| Abrasion Unidirectional scrape grams | 1.97=1.99 | 1.78=1.88 | 1.89=1.94 | 1.70=1.84 | 1.90=1.96 |
| Cut Through Temperature °C. | 360—360 | 365—365 | 360-355 | 358-370 | 350-352 |
| Heat Shock at 260°C. 20% Prestretch | | | | | |
| 1X diameter | 10 | 60 | 20 | 80 | 60 |
| 2X diameter | 100 | 90 | 90 | 90 | 70 |
| 3X diameter | | 90 | 90 | 100 | 100 |
| 4X diameter | | 100 | 100 | | |
| Burnout | 5.6** | 164.6☐ | 3.3** | 111.2☐ | 8.5** |

* A vertical 12 ft. oven
Δ A vertical 15 ft. oven
☐ Reliance burnout; a twisted sample of the enamelled wire subjected to 40 amperes until it shorts out, and time to failure measured in seconds. (potential between twists is 110 v)
** A twisted sample of the enamelled wire subjected to 33 amperes for 4 min. and the dielectric breakdown measured in kilovolts.

What is claimed is:

1. A polyamide-imide resin consisting essentially of the reaction product of (1) an aromatic diisocyanate in an amount of 0.95 to 1.01 moles, (2) an aromatic dicarboxylic acid selected from the group consisting of terephthalic acid, isophthalic acid, and benzophenone dicarboxylic acid in an amount of 0.05 to 0.40 moles, (3) an aromatic dianhydride selected from the group consisting of pyromellitic dianhydride, benzophenone dianhydride, naphthalene 2, 3, 6, 7 dianhydride, naphthalene 1, 2, 5, 6 dianhydride, diphenyl 2, 3, 2', 3'-dianhydride, the dianhydride of 2,2-bis (3', 4'-sisting of 4,4'-diisocyanato-diphenyl methane and mixtures thereof with up to 0.25 moles of toluylene disocyanate, and the dianhydride is selected from the group consisting of pyromellitic dianhydride and benzophenone dianhydride and mixtures thereof.

3. An electrical conductor provided with a continuous coating of the polyamide-imide of claim 2.

4. An electrical conductor according to claim 3 wherein the coating is applied directly to the conductor.

5. An electrical conductor according to claim 3 wherein the coating is applied over a polyester base coat.

6. An electrical conductor provided with a continuous coating of the polyamide-imide of claim 1.

7. A polyamide-imide resin according to claim 1 wherein the diiosocyanate is 4,4'-diisocyanatodiphenyl methane, the dicarboxylic acid is terephthalic acid and the dianhydride is selected from the group consisting of pyromellitic dianhydride and benzophenone dianhydride.

8. A polyamide-imide resin consisting essentially of the reaction product of (1) an aromatic diisocyanate in an amount of 0.95 to 1.01 moles, (2) an aromatic dicarboxylic acid selected from the group consisting of terephthalic acid, isophthalic acid, and benzophenone dicarboxylic acid in an amount of 0.05 to 0.40 mole, (3) an aromatic dianhydride selected from the group consisting of pyromellitic dianhydride, benzophenone dianhydride, naphthalene 2, 3, 6, 7 dianhydride, naphthalene 1, 2, 5, 6 dianhydride, diphenyl 2, 3, 2', 3'-dianhydride, the dianhydride of 2,2-bis (3', 4'-dicarboxyphenyl) propane, the dianhydride of bis (3,4-dicarboxyphenyl) sulfone and perylene 3,4,9,10-dianhydride in an amount of 0.01 to 0.30 mole, and (4) trimellitic anhydride in an amount of 0.5 to 0.80 moles, the total of (2), (3) and (4) adding up to 1 mole, in at least one solvent selected from the group consisting of N-methyl pyrrolidone, dimethyl acetamide, dimethyl formamide, dimethyl sulfoxide, N-methyl caprolactam, cresylic acid, p-cresol, m-p-cresol mixture, dimethyl sulfone, phenol, diethyl formamide and diethyl acetamide.

* * * * *